US009222694B2

(12) United States Patent
Tanaka et al.

(10) Patent No.: US 9,222,694 B2
(45) Date of Patent: Dec. 29, 2015

(54) REFRIGERATING CYCLE DEVICE

(75) Inventors: Kosuke Tanaka, Tokyo (JP); Yutaka Aoyama, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 693 days.

(21) Appl. No.: 13/124,252

(22) PCT Filed: Mar. 10, 2009

(86) PCT No.: PCT/JP2009/054565
§ 371 (c)(1),
(2), (4) Date: Apr. 14, 2011

(87) PCT Pub. No.: WO2010/061643
PCT Pub. Date: Jun. 3, 2010

(65) Prior Publication Data
US 2011/0197607 A1 Aug. 18, 2011

(30) Foreign Application Priority Data

Nov. 25, 2008 (JP) ................................. 2008-299289

(51) Int. Cl.
*F25B 49/00* (2006.01)
*F24F 11/00* (2006.01)
(Continued)

(52) U.S. Cl.
CPC .............. *F24F 11/008* (2013.01); *F25B 13/00* (2013.01); *B60H 1/3211* (2013.01);
(Continued)

(58) Field of Classification Search
CPC .............. Y02B 30/746; F25B 49/022; F25B 2600/0253; F25B 2600/111; F25B 2600/112; F25B 2600/2513; B60H 1/3211; F24F 11/0079; G05D 7/0635
USPC .......................... 62/228.1, 222, 183, 230, 179
See application file for complete search history.

(56) References Cited

U.S. PATENT DOCUMENTS 4,146,307 A * 3/1979 Gaffard ..................... 359/224.1
5,410,420 A * 4/1995 Winey et al. ................ 358/484
(Continued)

FOREIGN PATENT DOCUMENTS

GB 2 287 783 A 9/1995
JP 63-025446 A 2/1988
(Continued)

OTHER PUBLICATIONS

Prosalentis and Tombras. "A 2-bit Adaptive Delta Modulation System with Improved Performance". Published in 2007. Dept of Phyiscs at University of Athens. EURASIP Journal on Advances in Signal Processing. Article ID 16286.*
(Continued)

*Primary Examiner* — Marc Norman
*Assistant Examiner* — Max Snow
(74) *Attorney, Agent, or Firm* — Buchanan Ingersoll & Rooney PC (57) ABSTRACT

This invention optimizes the settings of refrigeration components to achieve a power efficient state. First, the compressor is run at a level that achieves a desired temperature. Next, the invention searches for the most energy efficient settings (claimed as operation manipulation amounts) for the fans and indoor expansion valves. The search algorithm tries adjusting the settings of each component by a predetermined amount, adopting the setting that is the most energy efficient for the refrigeration cycle. The algorithm then increases or decreases the predetermined amount, as appropriate, and repeats the search. This allows the invention to quickly and accurately converge on the most energy efficient setting for each component.

2 Claims, 8 Drawing Sheets

(51) Int. Cl.
*F25B 13/00* (2006.01)
*G05D 7/06* (2006.01)
*B60H 1/32* (2006.01)

(52) U.S. Cl.
CPC .... *F24F 11/0079* (2013.01); *F24F 2011/0075* (2013.01); *F25B 2313/0233* (2013.01); *F25B 2313/0293* (2013.01); *F25B 2313/0294* (2013.01); *F25B 2313/02741* (2013.01); *F25B 2313/0314* (2013.01); *F25B 2500/18* (2013.01); *F25B 2600/2513* (2013.01); *F25B 2700/15* (2013.01); *G05D 7/0635* (2013.01); *Y02B 30/746* (2013.01)

(56) References Cited

U.S. PATENT DOCUMENTS

| | | | | |
|---|---|---|---|---|
| 5,515,693 | A * | 5/1996 | Cahill-O'Brien et al. | 62/179 |
| 5,557,941 | A * | 9/1996 | Hanson et al. | 62/160 |
| 6,415,746 | B2 * | 7/2002 | Kobayashi et al. | 123/41.12 |
| 6,505,476 | B1 * | 1/2003 | Nishida et al. | 62/228.5 |
| 6,510,703 | B1 * | 1/2003 | Weng | 62/230 |
| 6,672,085 | B1 * | 1/2004 | Sangwan et al. | 62/133 |
| 6,755,035 | B1 * | 6/2004 | McNamara et al. | 62/175 |
| 6,807,470 | B2 * | 10/2004 | Hara | 701/36 |
| 7,584,021 | B2 * | 9/2009 | Bash et al. | 700/276 |
| 2003/0019221 | A1 * | 1/2003 | Rossi et al. | 62/127 |
| 2003/0101739 | A1 * | 6/2003 | Moon et al. | 62/228.1 |
| 2003/0209015 | A1 * | 11/2003 | Song | 62/6 |
| 2004/0031277 | A1 * | 2/2004 | Hirose et al. | 62/186 |
| 2004/0172960 | A1 * | 9/2004 | Nakamura et al. | 62/228.1 |
| 2005/0005621 | A1 * | 1/2005 | Jayadev | 62/230 |
| 2005/0155369 | A1 * | 7/2005 | Ootori et al. | 62/228.1 |
| 2005/0160747 | A1 * | 7/2005 | Kaga et al. | 62/228.1 |
| 2006/0112703 | A1 * | 6/2006 | Singh et al. | 62/183 |
| 2006/0272343 | A1 * | 12/2006 | Takahashi et al. | 62/230 |
| 2007/0070216 | A1 * | 3/2007 | Yabe | 348/229.1 |
| 2008/0011005 | A1 * | 1/2008 | Obayashi et al. | 62/243 |
| 2008/0140259 | A1 | 6/2008 | Bash et al. | |
| 2008/0178615 | A1 * | 7/2008 | Yoon et al. | 62/79 |
| 2010/0161134 | A1 * | 6/2010 | Takahashi | 700/276 |

FOREIGN PATENT DOCUMENTS

| | | |
|---|---|---|
| JP | 6-139296 A | 5/1994 |
| JP | 7-110165 A | 4/1995 |
| JP | 3156191 B2 | 4/2001 |
| JP | 3265803 B2 | 3/2002 |
| JP | 2004-176938 A | 6/2004 |

OTHER PUBLICATIONS

Office Action (Notification of the Second Office Action) issued Aug. 8, 2013 by the Chinese Patent Office in corresponding Chinese Patent Application No. 200980146939.6, and an English translation of the Office Action (5 pages).

Office Action (Notice of Reasons for Rejection) dated Jul. 24, 2012, issued in corresponding Japanese Patent Application No. 2010-540399, and an English Translation thereof. (6 pages).

International Search Report (PCT/ISA/210) issued on Jun. 16, 2009, by Japanese Patent Office as the International Searching Authority for International Application No. PCT/JP2009/054565.

Office Action (Text Portion of the First Office Action) dated Feb. 26, 2013, issued in corresponding Japanese Patent Application No. 200980146939.6, and an English Translation thereof. (14 pages).

Office Action (Notification of the Third Office Action) issued by the Chinese Patent Office on Oct. 24, 2013 in corresponding Chinese Patent Application No. 200980146939.6 and an English translation of the Official Action. (4 pages).

Jun. 18, 2014 European Search Report issued in European Patent Application No. 09828893.9.

* cited by examiner

INCREASE SUBSEQUENT D (INCREMENT RATIO)

FIG. 6

DECREASE SUBSEQUENT D (INCREMENT RATIO)

REFRIGERATING CYCLE DEVICE

TECHNICAL FIELD

The present invention relates to a refrigerating cycle device and particularly to reduction of power consumption.

BACKGROUND ART

In a prior-art refrigerating cycle device, the one "provided with a third calculation mechanism that makes correction so that the respective deviations of said opening degree and said rotation number determined by calculations are within a predetermined range and power consumption becomes a minimum value", for example, is proposed (See Patent Document 1, for example).
[Patent Document 1] Japanese Patent No. 3156191 (claim 1)

DISCLOSURE OF INVENTION

Problems to be Solved by the Invention

In the prior-art refrigerating cycle device, a direct purpose of the control is to control in order to minimize power consumption only when a deviation between a set value of a room temperature and the room temperature and a deviation between a target value of a superheat degree of a compressor and a detected value are within a predetermined range.

Therefore, if an application range of the control to minimize the power consumption is to be expanded, it is only necessary to expand the predetermined range, but in that case, since the deviation between the indoor temperature and the set temperature also becomes large, a case in which the power consumption becomes the minimum is an operation state in which the indoor temperature is higher for cooling, for example, and thus, there is a problem that comfort is lost.

Also, if a temperature sensor and a pressure sensor used for calculation of the superheat degree of the compressor and the like output detection values with a large error to an actual value due to aging deterioration, a failure or the like, the apparent deviation from the actually controlled target value becomes large, and the control to minimize the power consumption is not performed. Therefore, with the prior art, there is a problem that dependency on sensor accuracy is large.

Also, with the prior art, in a method of determining an operation manipulation amount to make the power consumption the minimum value, the amount is sequentially searched from an increase/decrease of the power consumption by means of a change only with a certain manipulation amount from the current manipulation amount, and thus, if a change amount of the certain manipulation amount is small, it is the same as a small gain, and therefore, there is a problem that it takes time until the operation state in which the power consumption becomes the minimum value is searched and convergence becomes poor.

On the contrary, if the change amount is large, hunting occurs in the operation state, and there is a problem that the state of the refrigerating cycle does not become stable.

The present invention was made in order to solve the above problems and has an object to obtain a refrigerating cycle device that can reduce the power consumption while cooling capacity or heating capacity is maintained.

Means for Solving the Problems

A refrigerating cycle device according to the present invention in which a compressor with variable operation capacity, a heat-source side heat exchanger attached with an outdoor blower, throttle means with variable throttle opening degree, and a use-side heat exchanger attached with an indoor blower are connected sequentially is provided with an air-temperature setter that sets a target value of a sucked air temperature or a blowoff air temperature of the use-side heat exchanger, operation control means that controls at least one of the operation capacity of the compressor, an air amount of the outdoor blower, an air amount of the indoor blower, and the throttle opening degree of the throttle means so that a deviation between the target value and the sucked air temperature or the blowoff air temperature becomes small, and power detecting means that detects power consumption of the refrigerating cycle device, in which the operation control means acquires an operation manipulation amount with which the power consumption of the refrigerating cycle device becomes the minimum for an operation manipulation amount of at least one of the operation capacity of the compressor, the air amount of the outdoor blower, the air amount of the indoor blower, and the throttle opening degree of the throttle means and at least one of the operation capacity of the compressor, the air amount of the outdoor blower, the air amount of the indoor blower, and the throttle opening degree of the throttle means is controlled in accordance with the operation manipulation amount.

Advantages

In the present invention, at least one of the operation capacity of the compressor, the air amount of the outdoor blower, the air amount of the indoor blower, and the throttle opening degree of the throttle means is controlled so that the deviation between the target value and the sucked air temperature or the blowoff air temperature becomes small, and the operation manipulation amount with which the power consumption of the refrigerating cycle device becomes the minimum is acquired for the operation manipulation amount of at least one of the operation capacity of the compressor, the air amount of the outdoor blower, the air amount of the indoor blower, and the throttle opening degree of the throttle means. Thus, the power consumption can be reduced while the cooling capacity or heating capacity is maintained.

REFERENCE NUMERALS 1 compressor
2 four-way valve
3 outdoor heat exchanger
4 outdoor blower
5a throttle means
5b throttle means
5d throttle means
6 liquid connection pipeline
7a indoor heat exchanger
7b indoor heat exchanger
8a indoor blower
8b indoor blower
9 gas connection pipeline
10 suction pressure sensor
11 suction temperature sensor
12 bypass circuit
20 receiver
100 operation control means
101 measurement portion
102 calculation portion
103 control portion
104 storage portion
105 comparison portion
106 determination portion
201 discharge temperature sensor
202 gas-side temperature sensor
203 outdoor temperature sensor
204 liquid-side temperature sensor
205a liquid-side temperature sensor
205b liquid-side temperature sensor
206a indoor temperature sensor
206b indoor temperature sensor
207a gas-side temperature sensor
207b gas-side temperature sensor
208 refrigerant-refrigerant heat exchanger low-pressure inlet temperature sensor
209 refrigerant-refrigerant heat exchanger low-pressure outlet temperature sensor
210 refrigerant-refrigerant heat exchanger
301 heat-source unit
302a use unit
302b use unit
400 pressure sensor
401 plate-type heat exchanger
402 fluid-inlet temperature sensor
403 fluid outlet temperature sensor
404 fluid feeding-out means

BEST MODES FOR CARRYING OUT THE INVENTION

Embodiment 1

Embodiments of the present invention will be described below referring to the attached drawings.

Figure 1:
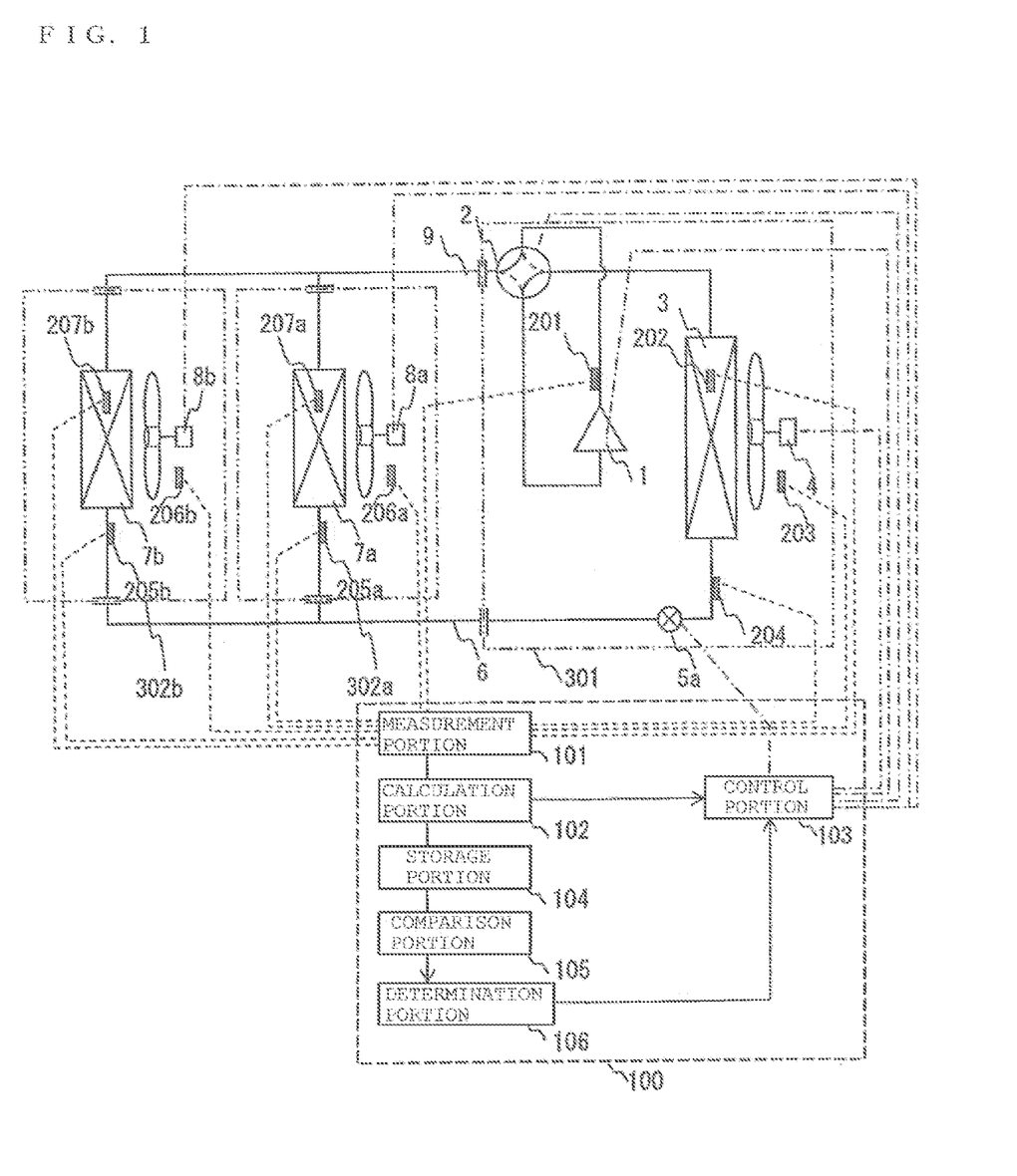
FIG. 1 is a refrigerant circuit diagram schematically illustrating a refrigerating cycle device according to Embodiment 1.

FIG. 1 is a refrigerant circuit diagram schematically illustrating a refrigerating cycle device according to Embodiment 1 of the present invention.

The refrigerating cycle device of this embodiment is a device used for indoor cooling/heating by performing a steam-compression type refrigerating cycle operation.

As shown in FIG. 1, the refrigerating cycle device has a plurality of (one in this embodiment) heat-source units 301 connected in parallel and a plurality of (two in this embodiment) use units 302a and 302b connected in parallel through a liquid connection pipeline 6 and a gas connection pipeline 9 so as to become refrigerant connection pipelines.

The refrigerant used in this refrigerating device includes HFC refrigerant such as R410A, R407C, and R404A, HCFC refrigerant such as R22 and R134a or natural refrigerant such as hydrocarbon and helium, for example.

<Use Unit>

The use units 302a and 302b are installed by being embedded in an indoor ceiling, being suspended or the like or being hung on an indoor wall surface or the like and connected to a heat-source unit 301 through the liquid connection pipeline 6 and the gas connection pipeline 9 so as to constitute a part of a refrigerant circuit.

Subsequently, a detailed configuration of the use units 302a and 302b will be described.

Since the use unit 302a and the use unit 302b share the similar configuration, only the use unit 302a will be described here, and a suffix "b" is added to each reference numeral for the use unit 302b.

The use unit 302a constitutes an indoor-side refrigerant circuit, which is a part of the refrigerant circuit, and is provided with an indoor blower 8a and an indoor heat exchanger 7a, which is a use-side heat exchanger.

The indoor heat exchanger 7a is made up by a cross-fin type fin-and-tube heat exchanger constituted by a heat transfer pipe and a large number of fins, for example, and functions as an evaporator of the refrigerant during a cooling operation so as to cool indoor air, while it functions as a condenser of the refrigerant during a heating operation so as to heat the indoor air.

The indoor blower 8a is attached to the indoor heat exchanger 7a, made up by a fan capable of varying a flow rate of air to be supplied to the indoor heat exchanger 7a such as a centrifugal fan or multi-blade fan driven by a DC fan motor (not shown), for example, and has a function to suck the indoor air into the use unit 302a thereby and to supply the air heat-exchanged by the indoor heat exchanger 7a with the refrigerant into the room as supplied air.

Also, in the use unit 302a, various sensors are installed.

That is, on the liquid side of the indoor heat exchanger 7a, a liquid-side temperature sensor 205a that detects a temperature in a liquid state of in a gas-liquid two-phase state (refrigerant temperature corresponding to a supercooled liquid temperature Tco during the heating operation or an evaporation temperature Te during the cooling operation) is disposed.

Also, in the indoor heat exchanger 7a, a gas-side temperature sensor 207a that detects a temperature of the refrigerant in the gas-liquid two-phase state (refrigerant temperature corresponding to a condensation temperature Tc during the heating operation or the evaporation temperature Te during the cooling operation) is disposed.

Moreover, on an inlet side of the indoor air of the use unit 302a, an indoor temperature sensor 206a that detects a temperature of the indoor air flowing into the unit (a sucked air temperature) is disposed. The indoor temperature sensor 206a may be disposed on an outlet side of the indoor air of the use unit 302a so as to detect a temperature of the indoor air discharged from inside the unit (a blowoff air temperature).

The liquid-side temperature sensor 205a, the gas-side temperature sensor 207a, and the indoor temperature sensor 206a are constituted by a thermistor, for example.

The indoor blower 8a is controlled by operation control means 100 (which will be described later) in accordance with detected values of these sensors. The control operation will be described later.

<Heat-Source Unit>

The heat-source unit 301 is installed outdoors and connected to the use units 302a and 302b through the liquid connection pipeline 6 and the gas connection pipeline 9 so as to constitute a part of the refrigerant circuit.

Subsequently, a detailed configuration of the heat-source unit 301 will be described.

The heat-source unit 301 is provided with a compressor 1, a four-way valve 2, an outdoor heat exchanger 3 as a heat-source side heat exchanger, an outdoor blower 4, and throttle means 5a.

The throttle means 5a is connected and installed on the liquid side of the heat-source unit 301. This throttle means 5a has a variable throttle opening-degree and adjusts a flow rate of the refrigerant flowing through the refrigerant circuit and the like.

The compressor 1 is capable of varying an operation volume and uses a volumetric compressor driven by a motor (not shown) controlled by an inverter, for example. This compressor 1 is controlled by a control portion 103. It is controlled in accordance with a variation between the indoor temperature sensors 206a and 206b of the indoor heat exchangers 7a and 7b and a set temperature of an air-temperature setter (target value), which will be described later, for example. The control operation will be described later.

In this embodiment, a case in which the number of the compressors 1 is only one will be described, but not limited to that, it is needless to say that two or more compressors 1 may be connected in parallel in accordance with the number of connected use units 302.

The four-way valve 2 is a valve that switches a direction of the refrigerant flow. This four-way valve 2 switches the refrigerant channel so as to connect the discharge side of the compressor 1 to the gas side of the outdoor heat exchanger 3 and the suction side of the compressor 1 to the gas connection pipeline 9 side so that the outdoor heat exchanger 3 functions as a condenser of the refrigerant compressed in the compressor 1 and the indoor heat exchangers 7a and 7b as evaporators of the refrigerant condensed in the outdoor heat exchanger 3 during the cooling operation (See a broken line of the four-way valve 2 in FIG. 1).

Also, the four-way valve 2 has a function to switch the refrigerant channel so as to connect the discharge side of the compressor 1 to the gas connection pipeline 9 side and the suction side of the compressor 1 to the gas side of the outdoor heat exchanger 3 so that the indoor heat exchangers 7a and 7b function as condensers of the refrigerant compressed in the compressor 1 and the outdoor heat exchanger 3 as an evaporator of the refrigerant condensed in the indoor heat exchangers 7a and 7b during the heating operation (See a solid line of the four-way valve 2 in FIG. 1).

The outdoor heat exchanger 3 is made up by a cross-fin type fin-and-tube heat exchanger constituted by a heat transfer pipe and a large number of fins, for example. This outdoor heat exchanger 3 has the gas side thereof connected to the four-way valve 2 and the liquid side connected to the liquid connection pipeline 6 so as to function as a condenser of the refrigerant during the cooling operation and as an evaporator of the refrigerant during the heating operation.

The outdoor blower 4 is attached to the outdoor heat exchanger 3 and is made up by a fan capable of varying an air flow rate to be supplied to the outdoor heat exchanger 3 such as a propeller fan driven by a DC fan motor (not shown), for example, and has a function to suck the outdoor air into the heat-source unit 301 and to discharge the air heat-exchanged by the outdoor heat exchanger 3 with the refrigerant to the outside of the room thereby.

Also, in the heat-source unit 301, various sensors are installed.

That is, in the compressor 1, a discharge temperature sensor 201 that detects a discharge temperature Td is disposed.

Also, in the outdoor heat exchanger 3, a gas-side temperature sensor 202 that detects a temperature of the refrigerant in a gas-liquid two-phase state (a refrigerant temperature corresponding to a condensation temperature Tc during the cooling operation or an evaporation temperature Te during the heating operation) is disposed.

Moreover, on the liquid side of the outdoor heat exchanger 3, a liquid-side temperature sensor 204 that detects a temperature of the refrigerant in a liquid state or a gas-liquid two-phase state is disposed.

Also, on the inlet side of the outdoor air in the heat-source unit 301, an outdoor temperature sensor 203 that detects a temperature of the outdoor air flowing into the unit, that is, an outside air temperature Ta is disposed.

The compressor 1, the four-way valve 2, the outdoor blower 4, and the throttle means 5a are controlled by the operation control means 100 (which will be described later) in accordance with detected values of these sensors. The control operation will be described later.

As mentioned above, the heat-source unit 301 and the use units 302a as well as 302b are connected to each other through the liquid connection pipeline 6 and the gas connection pipeline 9 so as to constitute the refrigerant circuit of the refrigerating cycle device.

<Control System>

The refrigerating cycle device in this embodiment has the operation control means 100, an air temperature setter, not shown, and power detecting means.

The air temperature setter sets set values (target values) of sucked air temperatures or blowoff air temperatures of the use units 302a and 302b.

The power detecting means has power detecting means or current detecting means that detects power supplied to the refrigerating cycle device and detects power consumption of the refrigerating cycle device.

The operation control means 100 has a measurement portion 101, a calculation portion 102, a control portion 103, a storage portion 104, a comparison portion 105, and a determination portion 106.

Into the measurement portion 101, various amounts detected by the various temperature sensors are inputted. The various amounts inputted to this measurement portion 101 are processed by the calculation portion 102, and the calculation results are sent to the control portion 103. Then, the control portion 103, on the basis of the calculation results of the calculation portion 102, drives and controls the compressor 1, the four-way valve 2, the outdoor blower 4, the throttle means 5a, and the indoor blower 8a so that they are contained within desired control target ranges.

Also, calculation results of an operation state amount obtained by the calculation portion 102 and the value of the power consumption of the refrigerating cycle device are stored in the storage portion 104.

Also, in the storage portion 104, the sampled power consumption is stored, and this stored value and the value of the power consumption of the current refrigerating cycle are compared in the comparison portion 105, the comparison results are sent to the determination portion 106, and an operation amount of the control portion 103 in the refrigerating cycle device is determined on the basis of the determination results.

Subsequently, the power-consumption minimization control to minimize the power consumption of the refrigerating cycle device of this embodiment will be described.

The power-consumption minimization control includes the cooling operation and the heating operation.

<Power-Consumption Minimization Control>

First, the cooling operation in the power-consumption minimization control will be described using FIG. 1.

During the cooling operation, the four-way valve 2 is in the state shown by the broken line in FIG. 1, that is, in a state in which the discharge side of the compressor 1 is connected to the gas side of the outdoor heat exchanger 3 and the suction side of the compressor 1 is connected to the gas sides of the indoor heat exchangers 7a and 7b. Also, the throttle means 5a adjusts an opening degree so that a superheat degree of the refrigerant on the suction side of the compressor 1 becomes a predetermined value. In this embodiment, the superheat degree of the refrigerant in the suction of the compressor 1 is acquired by first subtracting the evaporation temperature Te of the refrigerant detected by the gas-side temperature sensors 207a and 207b from the compressor suction temperature Ts.

Here, the compressor suction temperature Ts can be calculated using the following equation (1) by converting an evaporation temperature of the refrigerant detected by the gas-side temperature sensors 207a and 207b to a low-pressure saturated pressure Ps, by converting a condensation temperature of the refrigerant detected by the gas-side temperature sensor 202 to a high-pressure saturated pressure Pd, and supposing that a compression process of the compressor 1 is a polytropic change of a polytropic index n from the discharge temperature Td of the refrigerant detected by the discharge temperature sensor 201 of the compressor 1:

[Equation 1]

$$T_s = T_d \times \left(\frac{P_s}{P_d}\right)^{\frac{n-1}{n}} \quad (1)$$

Here, reference characters Ts and Td denote temperatures [K], reference characters Ps and Pd for pressures [MPa], and reference character n denotes the polytropic index [–]. The polytropic index may be a constant value (n=1.2, for example), but by defining it as a function of Ps and Pd, the compressor suction temperature Ts can be estimated more accurately.

Figure 2:
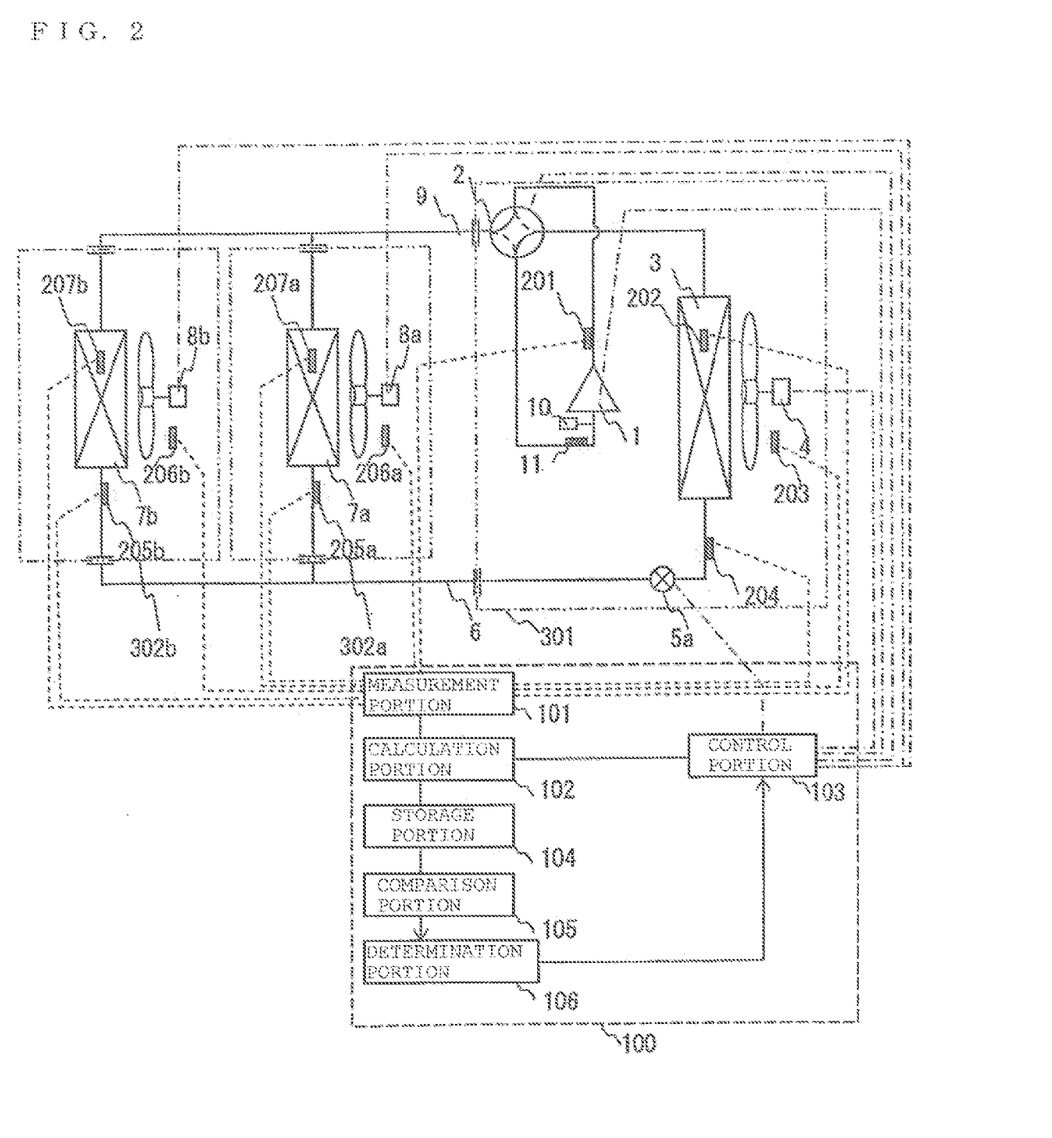
FIG. 2 is a refrigerant circuit diagram schematically illustrating the refrigerating cycle device according to Embodiment 1.

As shown in the refrigerant circuit diagram in FIG. 2, the superheat degree of the refrigerant may be detected by disposing the suction pressure sensor 10 and the suction temperature sensor 11 on the suction side of the compressor 1, by converting to a saturated temperature value corresponding to the evaporation temperature Te from the suction pressure Ps of the compressor 1 detected by the suction pressure sensor 10, and by subtracting the saturated temperature value of the refrigerant from a refrigerant temperature value detected by the suction temperature sensor 11.

In order to calculate the high-pressure pressure and the low-pressure pressure, conversion is made from the condensation temperature and the evaporation temperature of the refrigerant here, but it is needless to say that they may be acquired by directly adding the pressure sensors on the suction side and the discharge side of the compressor 1.

By starting the compressor 1, the outdoor blower 4, and the indoor blowers 8a and 8b in this state of the refrigerant circuit, the low-pressure gas refrigerant is sucked by the compressor 1 and compressed so as to become high-pressure gas refrigerant. After that, the high-pressure gas refrigerant is sent to the outdoor heat exchanger 3 through the four-way valve 2, heat-exchanged with the outdoor air supplied by the outdoor blower 4 and condensed so as to become the high-pressure liquid refrigerant.

Then, this high-pressure liquid refrigerant is decompressed by the throttle means 5a so as to become low-temperature low-pressure gas-liquid two-phase refrigerant, which is sent to the use units 302a and 302b through the liquid connection pipeline 6, heat-exchanged with the indoor air in the indoor heat exchangers 7a and 7b and evaporated so as to become a low-pressure gas refrigerant. Here, since the throttle means 5a controls the flow rate of the refrigerant flowing through the indoor heat exchangers 7a and 7b so that the superheat degree in the suction of the compressor 1 becomes a predetermined value, the low-pressure gas refrigerant evaporated in the indoor heat exchangers 7a and 7b is brought to a state with a predetermined superheat degree.

As mentioned above, through each of the indoor heat exchangers 7a and 7b, the refrigerant flows in a flow rate according to an operation load required in an air-conditioned space in which the use units 302a and 302b are installed.

This low-pressure gas refrigerant is sent to the heat-source unit 301 through the gas connection pipeline 9 and is sucked into the compressor 1 again through the four-way valve 2.

Subsequently, the heating operation will be described.

During the heating operation, the four-way valve 2 is in the state shown by the solid line in FIG. 1, that is, in a state in which the discharge side of the compressor 1 is connected to the gas sides of the indoor heat exchangers 7a and 7b and the suction side of the compressor 1 is connected to the gas side of the outdoor heat exchanger 3. Also, the throttle means 5a adjusts the opening degree so that the superheat degree of the refrigerant in the suction of the compressor 1 becomes a predetermined value in this embodiment, the superheat degree of the refrigerant in the suction of the compressor 1 is acquired first by subtracting the evaporation temperature Te of the refrigerant detected by the gas-side temperature sensor 202 from the compressor suction temperature Ts.

Here, the compressor suction temperature Ts can be calculated using the above-described equation (1) by converting the evaporation temperature of the refrigerant detected by the gas-side temperature sensor 202 to the low-pressure saturated pressure Ps, by converting the condensation temperature of the refrigerant detected by the gas-side temperature sensors 207a and 207b to the high-pressure saturated pressure Pd, and supposing that the compression process of the compressor 1 is the polytropic change of the polytropic index n from the discharge temperature Td of the refrigerant detected by the discharge temperature sensor 201 of the compressor 1.

As in the cooling operation, as shown in FIG. 2, the superheat degree of the refrigerant may be detected by disposing the suction pressure sensor 10 and the suction temperature sensor 11 on the suction side of the compressor 1, by converting to a saturated temperature value corresponding to the evaporation temperature Te from the suction pressure Ps of the compressor 1 detected by the suction pressure sensor 10, and by subtracting the saturated temperature value of the refrigerant from a refrigerant temperature value detected by the suction temperature sensor 11.

Similarly to the cooling operation, in order to calculate the high-pressure pressure and the low-pressure pressure, conversion is made from the condensation temperature and the evaporation temperature of the refrigerant here, too, but it is needless to say that they may be acquired by directly adding the pressure sensors on the suction side and the discharge side of the compressor 1.

By starting the compressor 1, the outdoor blower 4, and the indoor blowers 8a and 8b in this state of the refrigerant circuit, the low-pressure gas refrigerant is sucked by the compressor 1 and compressed so as to become high-pressure gas refrigerant and is sent to the use units 302a and 302b through the four-way valve 2 and the gas connection pipeline 9.

Then, the high-pressure gas refrigerant having been sent to the use units 302a and 302b is heat-exchanged with the indoor air in the indoor heat exchangers 7a and 7b and condensed so as to become a high-pressure liquid refrigerant and then, flows through the liquid connection pipeline 6 and is decompressed by the throttle means 5a so as to become a low-pressure gas-liquid two-phase-state refrigerant. Here, since the throttle means 5a controls the flow rate of the refrigerant flowing through the indoor heat exchangers 7a and 7b so that the superheat degree in the suction of the compressor 1 becomes a predetermined value, the high-pressure liquid refrigerant condensed in the indoor heat exchangers 7a and 7b is brought to a state having a predetermined supercooling degree.

As mentioned above, through each of the indoor heat exchangers 7a and 7b, the refrigerant flows in a flow rate according to the operation load required in the air-conditioned space in which the use units 302a and 302b are installed.

This low-pressure gas-liquid two-phase state refrigerant flows into the outdoor heat exchanger 3 of the heat-source unit 301.

Then, the low-pressure gas-liquid two-phase state refrigerant having flown into the outdoor heat exchanger 3 is heat-exchanged with the outdoor air supplied by the outdoor blower 4 and condensed so as to become the low-pressure gas refrigerant and is sucked into the compressor 1 again through the four-way valve 2.

As mentioned above, operation processing including the cooling operation and the heating operation is executed by the operation control means 100. That is, the operation control means 100 controls the operation so that a deviation between the target value set by the air temperature setter and the sucked air temperatures (or blowoff air temperatures) of the indoor heat exchangers 7a and 7b becomes small.

<Power Consumption Minimization Control Method>

Subsequently, an idea of the power consumption minimization control method will be described using FIG. 3.

Figure 3:
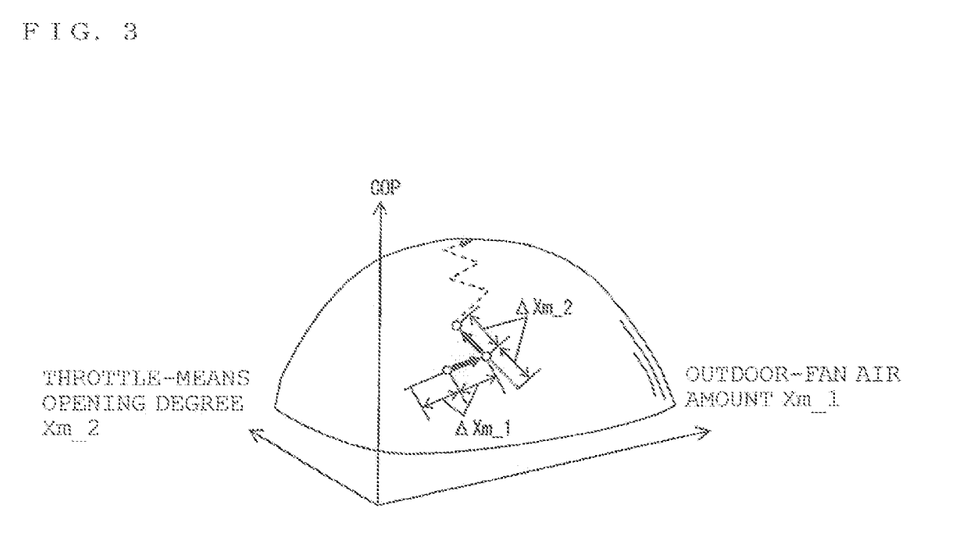
FIG. 3 is an explanatory diagram of power-consumption minimization control of the refrigerating cycle device according to Embodiment 1.

FIG. 3 is an explanatory diagram of the power consumption minimization control of the refrigerating cycle device according to Embodiment 1.

In FIG. 3, in a horizontal plane, as two operation manipulation amounts ($Xm\_n$: n=identification number), coordinate axes indicating a flow rate of air supplied by the outdoor blower 4 to the outdoor heat exchanger 3 (hereinafter referred to as "outdoor-fan air amount $Xm\_1$") and a throttle opening degree of the throttle means 5a (hereinafter referred to as "throttle-means opening degree $Xm\_2$") are taken. Also, a coordinate axis indicating a coefficient of performance, that is, COP is taken perpendicularly to this plane.

Here, it is supposed that an operation capacity (rotation number) of the compressor 1 is controlled all the time in accordance with an air-conditioning load so that the room temperature becomes a target set temperature.

In a state in which the cooling capacity or heating capacity of the refrigerating cycle device is maintained as above, a case in which operation manipulation amounts of the outdoor-fan air amount $Xm\_1$ and the throttle-means opening degree $Xm\_2$ so that the power consumption of the refrigerating cycle device becomes the minimum, that is, the coefficient of performance (COP) becomes the maximum, is considered.

First, the outdoor-fan air amount $Xm\_1$ is increased and decreased only by a predetermined amount $\Delta Xm\_1$. Then, the operation manipulation amount with the smallest power consumption in three points including the current $Xm\_1$ ($Xm\_1$ before increase and decrease), that is, the operation manipulation amount with the largest COP is adopted as the operation manipulation amount of the outdoor blower 4.

Subsequently, the opening degree $Xm\_2$ of the throttle means is increased and decreased only by a predetermined amount $\Delta Xm\_2$ in the state of the outdoor-fan air amount $Xm\_1$, and the operation manipulation amount with the smallest power consumption in the three points including the current $Xm\_2$ ($Xm\_2$ before the increase and the decrease), that is, the operation manipulation amount with a large COP is adopted as the operation manipulation amount of the throttle means 5a.

Then, in the state of the above throttle-means with opening degree $Xm\_2$, the outdoor-fan air amount $Xm\_1$ is increased and decreased only by the predetermined amount $\Delta Xm\_1$ again so as to acquire the operation manipulation amount with the small power consumption.

By sequentially repeating this operation, an operation state with the power consumption at the minimum value keeping the room temperature in condition of the target set temperature can be realized.

That is, the operation control means 100 controls the operation manipulation amount of the operation capacity of the compressor 1 so that the deviation between the target value set by the air temperature setter and the sucked air temperatures (or the blowoff air temperature) of the indoor heat exchangers 7a and 7b becomes small and acquires the operation manipulation amounts with which the power consumption of the refrigerating cycle device becomes the minimum for the outdoor-fan air amount $Xm\_1$ and the throttle-means opening degree $Xm\_2$.

In FIG. 3, the case in which the operation manipulation amounts of the outdoor-fan air amount $Xm\_1$ and the throttle-means opening degree $Xm\_2$ are acquired was described but the operation manipulation amounts with which the power consumption of the refrigerating cycle device becomes the minimum can be also acquired by sequentially performing control for another operation manipulation amount $Xm\_n$ such as the operation manipulation amount of the indoor blower 8a with the same idea.

In the above description, the case in which the operation manipulation amounts of the outdoor-fan air amount $Xm\_1$ and the throttle-means opening degree $Xm\_2$ are acquired by controlling the operation capacity of the compressor 1 in accordance with the air-conditioning load was described, but the present invention is not limited to that, and at least one operation manipulation amount in the operation capacity of the compressor 1, the air amount of the outdoor blower 4, the air amount of the indoor blower 8, the throttle opening degree of the throttle means 5a and the like may be controlled so that the deviation between the target value and the sucked air temperature (or the blowoff air temperature) becomes small and the operation manipulation amount with which the power consumption of the refrigerating cycle device becomes the minimum may be acquired for the operation manipulation amount other than the operation manipulation amount for performing control so that the deviation becomes small.

Subsequently, a detailed operation of the operation control means 100 in the power consumption minimization control will be described using a flowchart in FIG. 4. Here, it is supposed that in order to realize the power consumption minimization, an evaluation function, which is the power consumption, is defined by n pieces of variables of Xm_1 to Xm_n.

Figure 4:
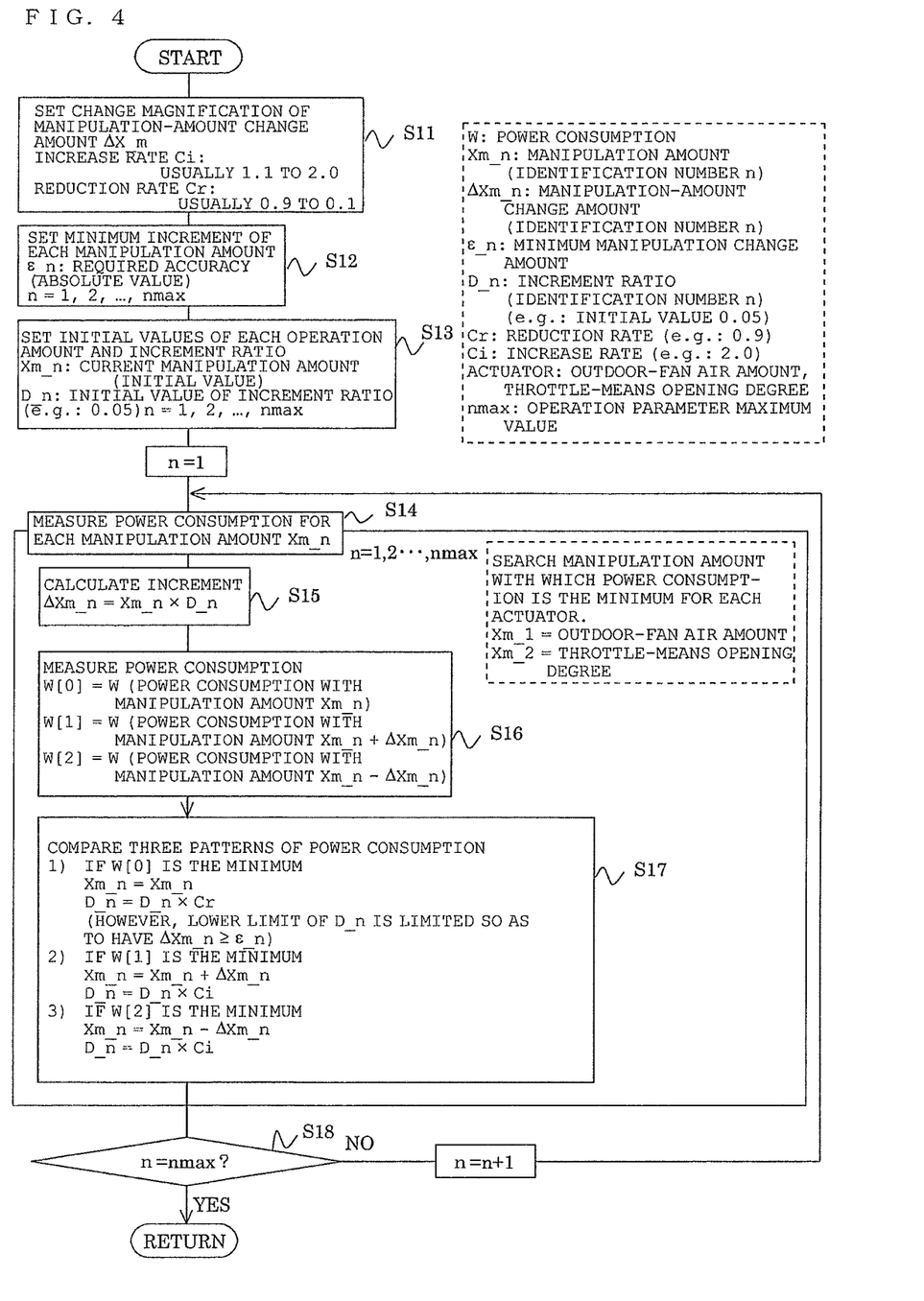
FIG. 4 is an operation flowchart of the power-consumption minimization control of the refrigerating cycle device according to Embodiment 1.

FIG. 4 is an operation flowchart of the power consumption minimization control of the refrigerating cycle device according to Embodiment 1. Each step in FIG. 4 will be described below.

(S11)

First, the operation portion 102 sets an increase rate Ci and a reduction rate Cr in "Setting of changed magnification of manipulation-amount change amount ΔXm_n".

This increase rate Ci is used as a magnification to increase the manipulation-amount change amount ΔXm_n if the manipulation amount Xm_n is changed in "Measurement of power consumption for each manipulation amount Xm_n", which will be described later.

Also, the reduction rate Cr is used as a ratio to reduce the manipulation-amount change amount Δ Xm_n if the manipulation amount of Xm_n is not changed in "Measurement of power consumption for each manipulation amount Xm_n" similarly. The increase rate Ci is usually 1.1 to 2.0 and the reduction rate Cr is usually 0.9 down to 0.1 and they are fixed to values set at the minimum.

By using the increase rate Ci and the reduction rate Cr, the manipulation-amount change amount ΔXm_n is flexibly changed, and accuracy to realize an operation state where a converging rate and power consumption are minimized is improved.

(S12)

Subsequently, the Calculation Portion 102 Sets a Value of a Minimum operation manipulation amount as required accuracy (absolute value) of each variable in "Setting of minimum increment of each manipulation amount".

That is, an update limit of each manipulation amount is set so that the manipulation-amount change amount ΔXm_n does not become smaller than the minimum manipulation change amount ϵ_n. The value of this minimum manipulation change amount ϵ_n is a minimum opening-degree change amount in the case of the opening degree of the throttle means, for example, and it corresponds to one pulse if it is an electric expansion valve. In the case of an outer-fan air amount, it is, a minimum fan-motor change rotation number.

(S13)

Moreover, the Calculation Portion 102 Sets an Initial Value of the manipulation amount Xm_n and an initial value of an increment ratio D_n in "Setting of initial values of each operation amount and increment ratio".

As the initial value of each manipulation amount Xm_n, a current manipulation amount is inputted. As the initial value of the increment ratio D_n, a predetermined value (0.05, for example) is inputted.

(S14)

From here, a repetition loop in which "Measurement of power consumption for each manipulation amount Xm_n" is performed begins.

(S15)

First, in the repetition loop, the calculation portion 102 first calculates the manipulation-amount change amount ΔXm_n by the following equation in "Calculate increment":

[Equation 2]

$$\Delta X_{m\_n} = X_{m\_n} \times D_{\_n} \quad (2)$$

(S16)

Subsequently, the calculation portion 102 increases and decreases the manipulation amount Xm_n only by the manipulation-amount change amount ΔXm_n in "Measurement of power consumption". Then, a value of the power consumption is obtained from the power detecting means in three patterns, that is, the manipulation amount Xm_n, the manipulation amount Xm_n+ΔXm_n, and the manipulation amount Xm_n−ΔXm_n. Then, the obtained values of the power consumption is stored in the storage portion 104 as W[0], W[1], and W[2], respectively.

(S17)

Subsequently, in "Compare Three Patterns of Power Consumption", the comparison portion 105 compares the values of the power consumption W[0], W[1], and W[2] stored in the storage portion 104.

The determination portion 106 determines the value with the smallest power consumption in the values of power consumption W[0], W[1], and W[2] compared by the comparison portion 105 and selects the manipulation amount in the power consumption.

The control portion 103 adopts the manipulation amount selected by the determination portion 106 and performs operation manipulation.

Moreover, if the power consumption is the minimum at the initial manipulation amount Xm_n (manipulation amount before increase or decrease), that is, if the operation manipulation amount manipulated by the control portion 103 has not been updated, the calculation portion 102 sets the value obtained by multiplying the increment ratio D_n by the decrease rate Cr to the subsequent increment ratio D_n.

On the other hand, if the power consumption is the minimum at the manipulation amount Xm_n+ΔXm_n or the manipulation amount Xm_n−ΔXm_n, that is, if the operation manipulation amount manipulated by the control portion 103 has been updated, the calculation portion sets the value obtained by multiplying the increment ratio D_n by the increase rate Ci to the subsequent increment ratio D_n.

Then, the calculation portion 102 repeats Steps S15 to S17 until the manipulation amount Xm_n with the minimum power consumption converges using the updated increment ratio D_n.

The determination on convergence of the manipulation amount Xm_n is made such that the manipulation amount Xm_n is determined to be converged when the manipulation-amount change amount ΔXm_n becomes not more than the minimum manipulation change amount ϵ_n, for example.

That is, the value of the increment ratio D_n limits a lower limit value of the increment ratio D_n so that the manipulation-amount change amount ΔXm_n ≥ the minimum manipulation change amount ϵ_n is obtained.

Here, a method of changing the manipulation-amount change amount ΔXm in search of the minimum value of the power consumption W will be described using FIGS. 5 and 6.

Figure 5:
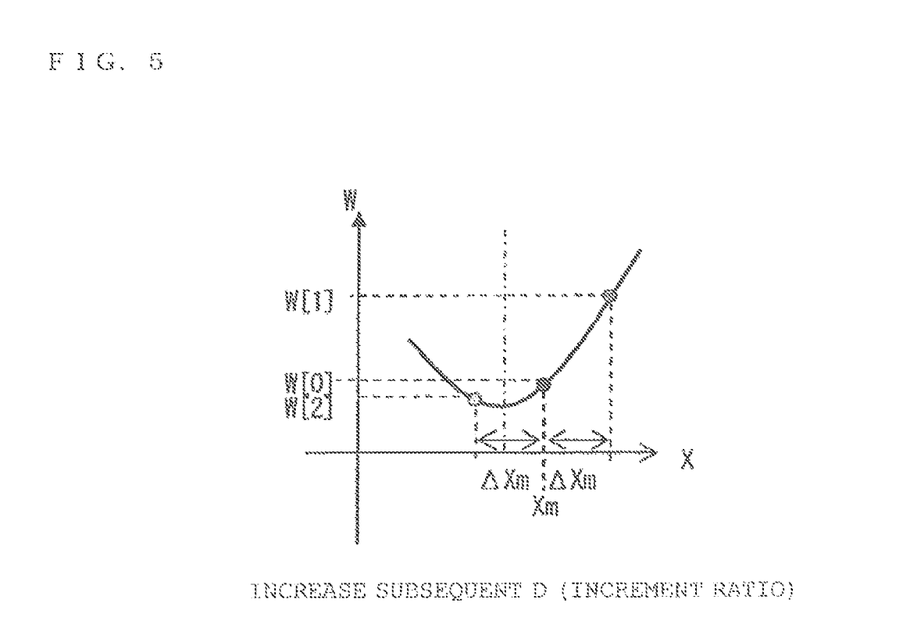
FIG. 5 is a diagram for explaining a method of changing a manipulation-amount change amount ΔXm according to Embodiment 1.
Figure 6:
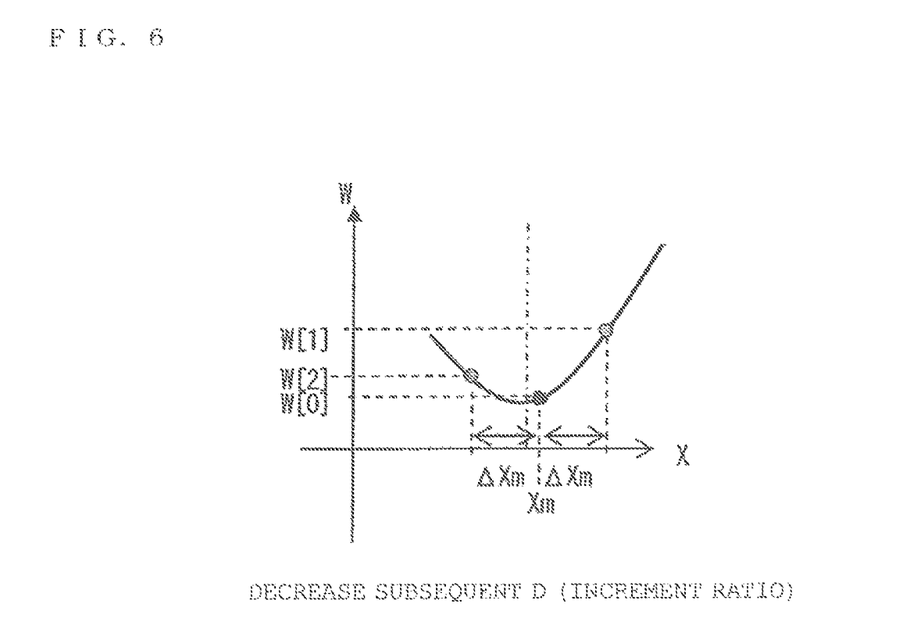
FIG. 6 is a diagram for explaining a method of changing the manipulation-amount change amount ΔXm according to Embodiment 1.

FIGS. 5 and 6 are diagrams for explaining the method of changing the manipulation-amount change amount ΔXm according to Embodiment 1.

In FIGS. 5 and 6, an input with the manipulation amount Xm_n is set at W[0] based on the manipulation amount Xm_n, and inputs when the amount is changed by +ΔXm_n and −ΔXm_n are set at W[1] and W[2], respectively.

If, as shown in FIG. 5, the minimum value of the power consumption W is W[1] or W[2] as the result of the comparison of W[0], W[1], and W[2], for example, a solution with which W becomes the minimum is likely to be outside a range of the manipulation amount Xm±ΔXm. Thus, the subsequent increment ratio $D\_n$ is increased so as to increase the manipulation-amount change amount $\Delta Xm\_n$.

On the other hand, as shown in FIG. 6, for example, if the minimum value of the power consumption W is W[0] as the result of the comparison of W[0], W[1], and W[2], the solution with which W becomes the minimum is likely to be within a range of the manipulation amount $Xm\_n \pm \Delta Xm\_n$. Thus, the subsequent increment ratio $D\_n$ is decreased so as to decrease the manipulation-amount change amount $\Delta Xm$.

As mentioned above, by sequentially updating the manipulation-amount change amount $\Delta Xm\_n$, the manipulation amount $\Delta Xm\_n$ with which the power consumption W becomes the minimum can be acquired with favorable convergence (at a high converging rate) and high accuracy.

(S18)

Subsequently, the calculation portion 102 changes the manipulation parameter to the subsequent parameter (n=n+1) and performs "Measurement of power consumption for each manipulation amount $Xm\_n$" at Step S14 again for the manipulation amount $Xm\_n$.

Then, once all the manipulation parameter numbers (n=nmax) have been performed, the routine returns to the first manipulation parameter (n=1) and the same operation is repeated.

In the above explanation (FIG. 4), the procedure in which the manipulation amount $Xm\_n$ is separately changed one by one is shown, but another manipulation amount may be changed at the same time while one manipulation amount is being changed with three patterns.

As a result, convergence can be realized from a parameter with a greater influence in the minimization of the power consumption, and the power consumption can be minimized efficiently in terms of time.

In the above explanation (FIG. 4), restriction may be provided for the manipulation-amount change amount $\Delta m\_n$. That is, if it is assumed that the state of the refrigerating cycle gets closer to the operation outside an operation warranty range of the device by changing the manipulation amount of the parameter calculated by the calculation portion 102, a restriction condition that the operation change is prohibited is provided. That is, the control according to the operation manipulation amount is executed if the operation manipulation amount with which the power consumption becomes the minimum is within the predetermined operation warranty range.

As a result, the optimal operation state with which the power consumption becomes the minimum can be realized within the restriction of the operation warranty range.

For example, the operation outside the operation warranty range, here, means that in an operation state in which the high pressure of the refrigerating cycle during the cooling is close to a high-pressure upper limit value, which is the operation warranty of the device, an operation to lower the outdoor-fan air amount certainly raises the high-pressure pressure, which might lead to the operation outside the operation warranty range, but by prohibiting the operation to lower the air amount, the operation outside the operation warranty can be avoided.

As mentioned above, in this embodiment, the operation manipulation amount of the operation capacity of the compressor 1 is controlled so that the deviation between the target value set by the air temperature setter and the sucked air temperature (or the blowoff air temperature) of the indoor heat exchangers 7a and 7b becomes small, and an operation manipulation amount with which the power consumption of the refrigerating cycle device becomes the minimum is acquired for the operation manipulation amounts of the air amount of the outdoor blower 4, the air amount of the indoor blower 8 and the throttle opening degree of the throttle means 5a.

Thus, the power consumption can be reduced while the cooling capacity or the heating capacity is maintained. Therefore, while the deviation between the indoor temperature and the set temperature is made small and the comfort in the room is maintained even in any installation or environmental condition, the operation state in which the power consumption is minimized can be acquired.

Also, in the power consumption minimization control in this embodiment, there is no need to measure a state amount of the refrigerant in the refrigerating cycle such as a supercooling degree, a superheat degree and the like since the operation state with which the power consumption is inevitably the smallest, that is, the manipulation amount with which the heat exchange performance is the highest is searched with a measurement amount of the power consumption.

That is, even if the measuring means that measures the refrigerant state of the refrigerating cycle such as the supercooling degree, the superheat degree and the like becomes incapable of measurement due to aging deterioration or a failure, highly efficient operation can be realized in a state in which reliability of the device is maintained.

Thus, dependency on the sensor accuracy can be decreased. Therefore, the highly efficient operation state is held all the time, and reliability of the device can be ensured.

Also, in "Measure power consumption for each manipulation amount $Xm\_n$", the manipulation amount $Xm\_n$ is increased and decreased only by the manipulation-amount change amount $\Delta Xm\_n$ and the operation manipulation amount with which the power consumption W of the refrigerating cycle device becomes the minimum is acquired on the basis of the power consumption W[0], W[1], and W[2] at this time. Then, according to the comparison result of the power consumption, the increment ratio $D\_n$ of the manipulation-amount change amount $\Delta Xm\_n$ is increased (increase rate Ci) or decreased (reduction rate Cr). Using this updated manipulation-amount change amount $\Delta Xm\_n$, the operation manipulation amount with which the power consumption becomes the minimum is repeatedly acquired.

Thus, the manipulation amount $Xm\_n$ with which the power consumption W becomes the minimum can be acquired with good convergence (at a high converging rate) and high accuracy. Therefore, the optimal operation state in which the power consumption is the minimum can be quickly realized.

The power consumption minimization control in this embodiment is not to change a basic control method of control in the prior-art refrigerating cycle device, and if this power consumption minimization is not necessary or possible, the power consumption minimization may be stopped or paused on the basis of determination by the user or the operation control means 100.

In this embodiment, the minimization of the power consumption is explained as the purpose, but instead, maximization of the coefficient of performance (COP) or energy efficiency may be used as an evaluation target. Since this can be acquired from the ratio between the capacity of the refrigerating cycle and the power consumption, the outcome means the same.

In addition to the configuration of the refrigerating cycle device in this embodiment, a local controller as a managing device that manages each constituent apparatus and conducts communication with outside such as a telephone line, a LAN line, wireless communication or the like and obtains operation data may be connected in the configuration. By connecting such a local controller to a remote server of an information management center that receives the operation data of the refrigerating cycle device through a network and by connecting a storage device such as a disk device that stores the power consumption to the remote server, the power consumption minimization control system can be configured.

For example, such configuration might be possible that the local controller is made to be the measurement portion 101 that obtains the power consumption of the refrigerating cycle device and the calculation portion 102 that calculates the manipulation amount, the storage device is made to be the storage portion 104, and the remote server is made to function as the comparison portion 105, the determination portion 106, and an alarm portion.

In this case, there is no need any longer for the refrigerating cycle device to have the function to calculate and compare the current power consumption and the reference value of the operation state amount or the like.

Also, by configuring such system capable of remote monitoring as above, a work by a worker to go to the site and to operate or stop the power consumption minimization control is not needed any longer at the time of regular maintenance, and operability of the device is improved.

This embodiment has been described based on the attached drawings, but the specific configuration is not limited to that, and is capable of changes within a range not departing from the gist of the invention.

For example, in this embodiment, the case in which the present invention is applied to the refrigerating cycle device capable of switching between cooling and heating was explained as an example, but not limited to that, the present invention may be applied to a refrigerating cycle device exclusively for heating, exclusively for cooling or capable of simultaneous operation of cooling and heating.

Also, the present invention may be applied to a small-sized refrigerating cycle device such as a room air-conditioner or a refrigerator for home use or a large-sized refrigerating cycle device such as a freezer for cooling a refrigerated warehouse or a heat pump chiller.

Also, in this embodiment, the case in which the present invention is applied to a refrigerating cycle device provided with the single heat-source unit 301 has been explained as an example, but not limited to that, the present invention may be applied to a refrigerating cycle device provided with a plurality of the heat-source units 301.

Embodiment 2

Figure 7:
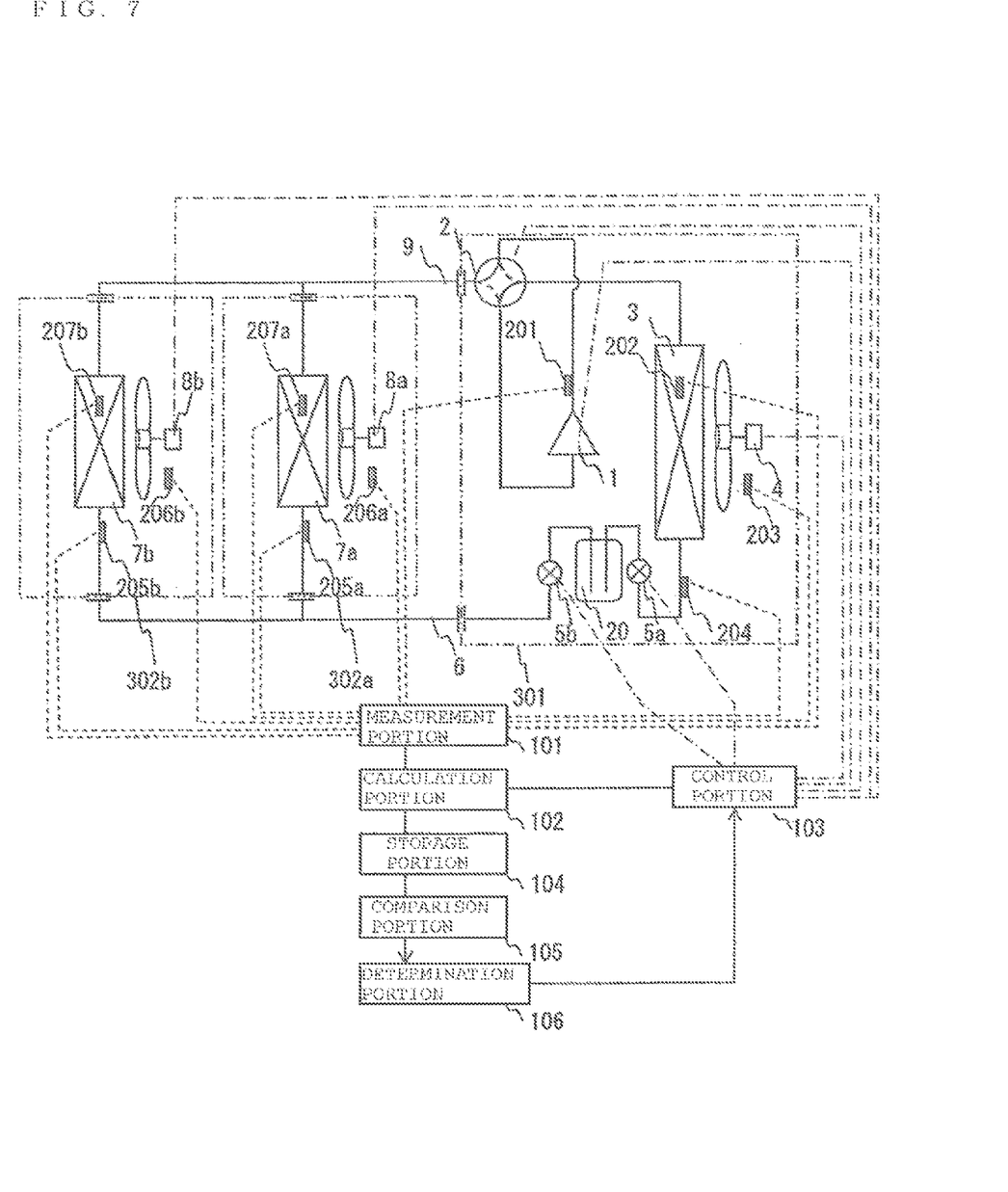
FIG. 7 is a refrigerant circuit diagram schematically illustrating a refrigerating cycle device according to Embodiment 2.

FIG. 7 is a refrigerant circuit diagram schematically illustrating a refrigerating cycle device according to Embodiment 2.

In FIG. 7, the same reference numerals are given to the same portions as in the above-described Embodiment 1.

In the refrigerating cycle device of this embodiment, as shown in FIG. 7, a receiver 20 that reserves an excess refrigerant amount, which is a difference in required refrigerant amounts between cooling and heating, is disposed after the throttle means 5a, and throttle means 5b is newly added between the receiver 20 and the channel of the liquid connection pipeline 6. Such configuration is suitable for a refrigerating cycle device of a type having a longer connection pipeline length at the site and a large amount of excess refrigerant caused by the difference between cooling and heating.

The other configurations are the same as in the above-described Embodiment 1.

With the above configuration, in the power consumption minimization control of the refrigerating cycle device in this embodiment, only a valve opening degree of the throttle means 5a or the throttle means 5b is increased as the manipulation parameter as the manipulation amount Xm_n.

Therefore, since the basic idea of the power consumption minimization control is not changed in Embodiment 2, either, the operation to minimize the power consumption can be realized as in Embodiment 1.

Embodiment 3

Figure 8:
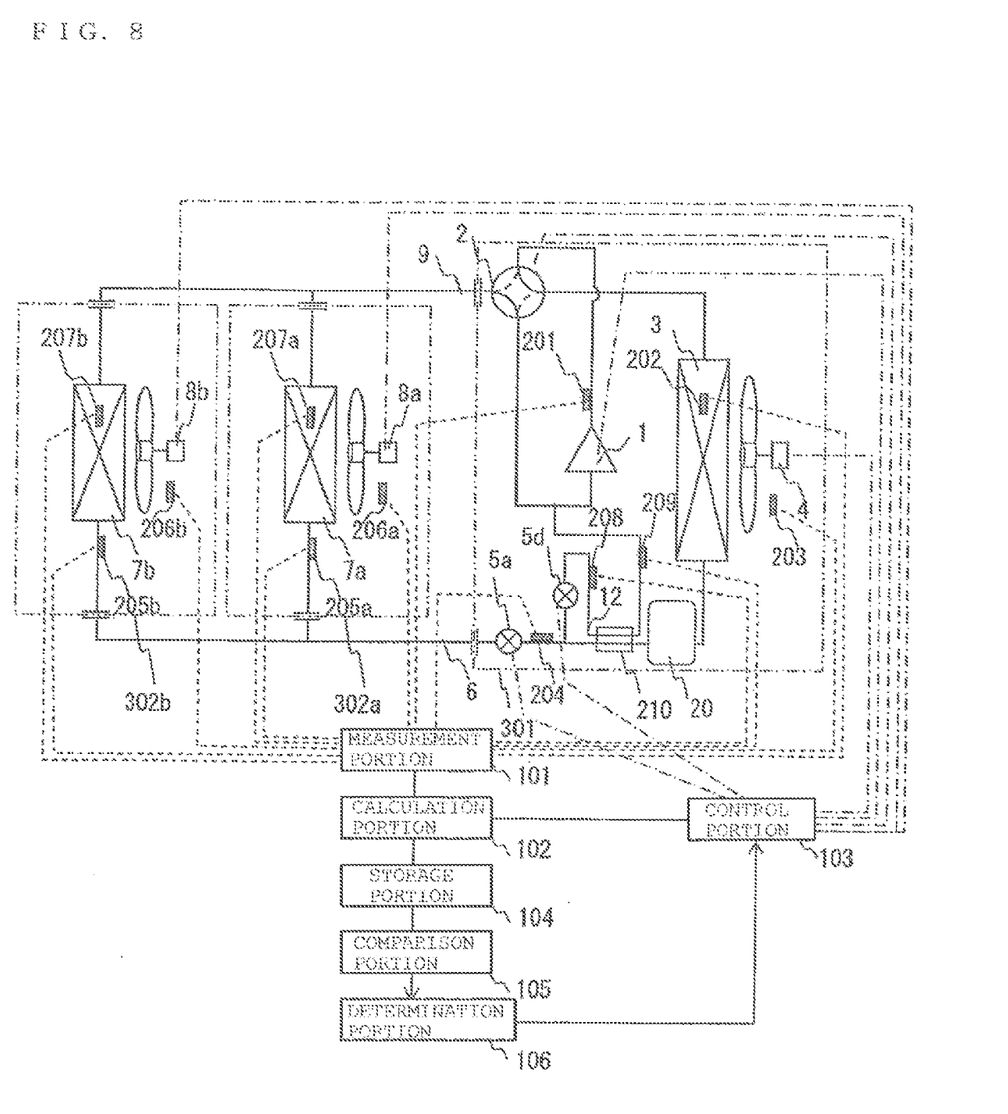
FIG. 8 is a refrigerant circuit diagram schematically illustrating a refrigerating cycle device according to Embodiment 3.

FIG. 8 is a refrigerant circuit diagram schematically illustrating a refrigerating cycle device according to Embodiment 3.

In FIG. 8, the same reference numerals are given to the same portions as in the above-described Embodiment 1.

In the refrigerating cycle device in this embodiment, as shown in FIG. 8, the receiver 20 is disposed between the liquid-side temperature sensor 204 and the outdoor heat exchanger 3 shown in Embodiment 1, a refrigerant-refrigerant heat exchanger 210 is disposed between the receiver 20 and the liquid-side temperature sensor 204, the refrigerant after having passed through the high-pressure side refrigerant-refrigerant heat exchanger is decompressed by the throttle means 5d, the low-temperature and low-pressure refrigerant is made to flow through the refrigerant-refrigerant heat exchanger, a bypass circuit 12 that increases cooling capacity by raising the supercooling degree of the refrigerant after passing through the receiver is provided, and a refrigerant-refrigerant heat-exchanger inlet temperature sensor 208 and a refrigerant-refrigerant heat-exchanger outlet temperature sensor 209 are disposed before and after the refrigerant-refrigerant heat exchanger 210.

As the refrigerant-refrigerant heat exchanger 210, a plate-type heat exchanger, a double-pipe type heat exchanger or the like may be used.

The other configurations are the same as in Embodiment 1 described above.

With the above configuration, in the power consumption minimization control of the refrigerating cycle device in this embodiment, only a valve opening degree of the throttle means 5d is increased as the manipulation parameter.

Therefore, since the basic idea of the power consumption minimization control is not changed in Embodiment 3, either, the operation to minimize the power consumption can be realized as in Embodiment 1.

In this embodiment, the refrigerant circuit configuration is shown with the receiver 20 disposed, but it may be a configuration without the receiver 20.

Embodiment 4

Figure 9:
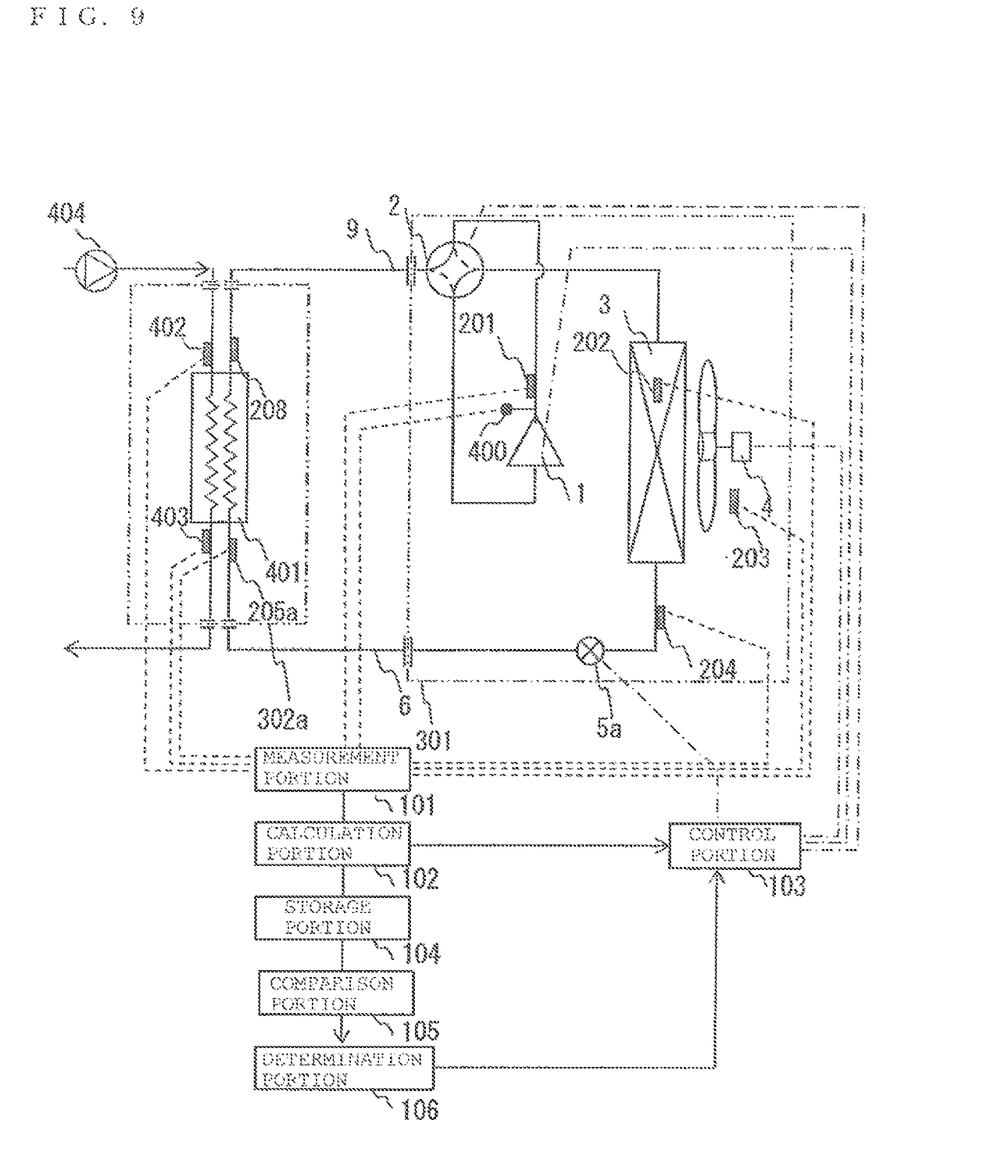
FIG. 9 is a refrigerant circuit diagram schematically illustrating a refrigerating cycle device according to Embodiment 4.

FIG. 9 is a refrigerant circuit diagram schematically illustrating a refrigerating cycle device according to Embodiment 4.

In FIG. 9, the same reference numerals are given to the same portions as in the above-described Embodiment 1.

In the refrigerating cycle device of this embodiment, as shown in FIG. 9, a pressure sensor 400 that detects a high-pressure pressure is disposed on a discharge portion of the compressor 1 shown in Embodiment 1, the use unit 302a constitutes an indoor-side refrigerant circuit, which is a part of the refrigerant circuit, and is constituted by a plate-type heat exchanger 401, which is a use-side heat exchanger, fluid feeding-out means 404 that heat-exchanges with the refrigerant flowing through the plate-type heat exchanger, a fluid inlet temperature sensor 402 that detects temperatures before and after heat exchange of the fed-out fluid, and a fluid outlet temperature sensor 403.

The other configurations are the same as in the above Embodiment 1.

Here, the fluid that exchanges heat with the refrigerant flowing through the plate-type heat exchanger 401 may be anything as long as it is a target of heat absorption of condensation heat of the refrigerant such as water, refrigerant, brine and the like. Also, the fluid feeding-out means 404 may be a compressor, a pump or the like.

Also, the plate-type heat exchanger 401 is not limited to this form but may be a double-pipe heat exchanger, a micro channel or the like as long as it is capable of heat exchange between the refrigerant and the fluid.

With the above refrigerant circuit configuration, too, the refrigerating cycle becomes the same refrigerant circuit as in the above-described Embodiment 1.

Therefore, the operation in Embodiment 4 to minimize the power consumption can be realized as in Embodiment 1.

The invention claimed is:

1. A refrigerating cycle device in which a compressor whose operation capacity is variable, a heat-source side heat exchanger to which an outdoor blower is attached, throttle means with a variable throttle opening degree, and a use-side heat exchanger to which an indoor blower is attached, are all connected together sequentially, comprising:

an air-temperature setter that sets a target value of a sucked air temperature or a blowoff air temperature of said use-side heat exchanger; and an operation control device that controls the operation capacity of said compressor so that a deviation between said target value and said sucked air temperature becomes smaller, wherein said operation control device is configured to perform an operation that:

increases and then decreases, or decreases and then increases the operation manipulation amounts of the air amount of said outdoor blower, the air amount of said indoor blower, and the throttle opening degree of said throttle means by a predetermined amount, respectively, while maintaining the operation capacity of compressor, detects power consumption of a refrigerating cycle based on (i) the operation manipulation amount increased by said predetermined amount, (ii) the operation manipulation amount decreased by said predetermined amount, and (iii) the operation manipulation amount before said increase and the decrease by said predetermined amount, when said detected power consumption based on the operation manipulation amount increased by said predetermined amount or the operation manipulation amount decreased by said predetermined amount is a smallest value as compared with other values measured in this iteration of the refrigerating cycle:

updates the operation manipulation amount for the minimum power consumption as a relevant operation manipulation amount, and increases said predetermined amount and makes the relevant operation manipulation amount increase and decrease again by the increased predetermined amount, respectively, and when detected power consumption of the refrigerating cycle based on the operation manipulation amount before the increase by said predetermined amount or in the operation manipulation amount before the decrease by said predetermined amount is a smallest value as compared with other values measured in this iteration of the refrigerating cycle:

updates the operation manipulation amount for the minimum power consumption as a relevant operation manipulation amount, and decreases said predetermined amount and makes the relevant operation manipulation amount increase and decrease again by the decreased predetermined amount, respectively, and wherein said operation control device is further configured to repeat said operation until said relevant operation manipulation amount converges to acquire an operation manipulation amount with which the power consumption of the refrigerating cycle device is a minimum value, and control the air amount of said outdoor blower, the air amount of said indoor blower, and the throttle opening degree of said throttle means in accordance with the acquired operation manipulation amount.

2. The refrigerating cycle device of claim 1, wherein said operation control device executes control according to the operation manipulation amount if said operation manipulation amount with which the power consumption of the refrigerating cycle device becomes minimum is within a predetermined operation warranty range.

\* \* \* \* \*

UNITED STATES PATENT AND TRADEMARK OFFICE
CERTIFICATE OF CORRECTION

| | |
|---|---|
| PATENT NO. | : 9,222,694 B2 |
| APPLICATION NO. | : 13/124252 |
| DATED | : December 29, 2015 |
| INVENTOR(S) | : Kosuke Tanaka et al. |

It is certified that error appears in the above-identified patent and that said Letters Patent is hereby corrected as shown below:

Title Page, Item (54): change "REFRIGERATING CYCLE DEVICE" to --ENERGY SAVING SEARCH ALGORITHM FOR A REFRIGERATION CYCLE--.

Signed and Sealed this
Third Day of May, 2016

Michelle K. Lee
*Director of the United States Patent and Trademark Office*